H. L. DOHERTY.
PROCESS OF AND APPARATUS FOR PRODUCING GAS.
APPLICATION FILED SEPT. 5, 1913.
1,235,774.
Patented Aug. 7, 1917.
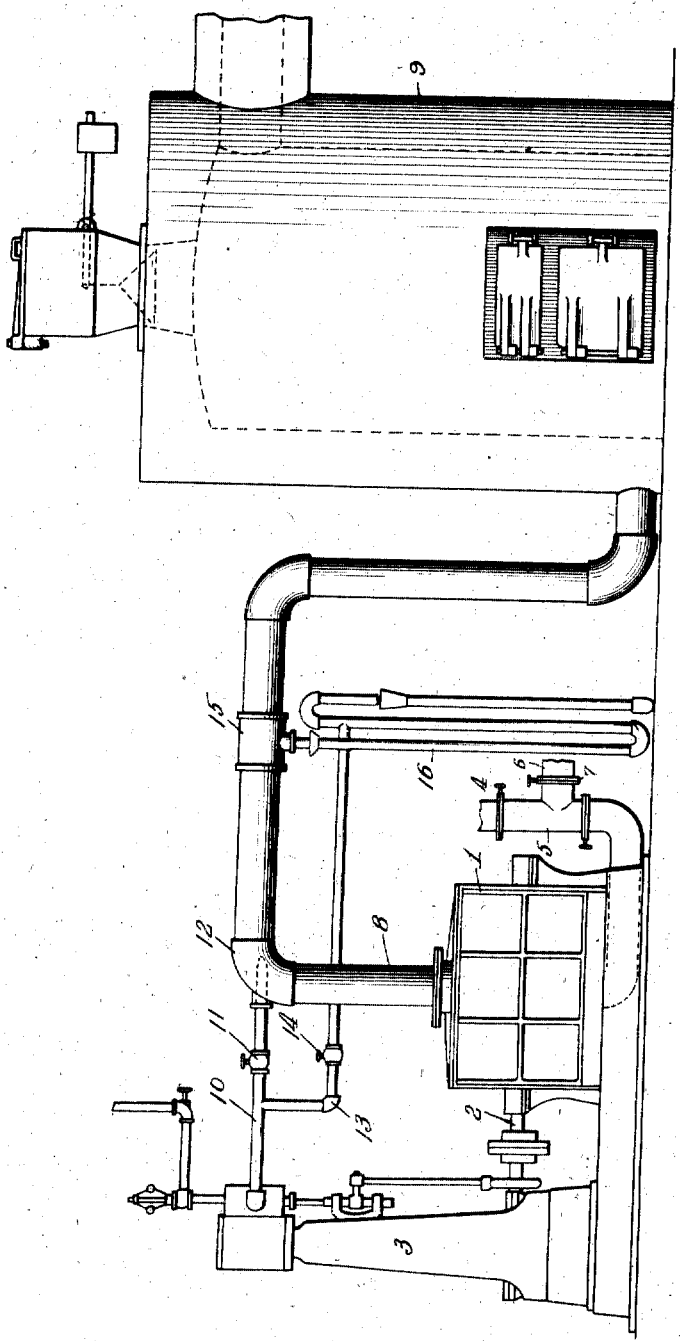
Witnesses
H. C. Robinette
Hilda Schoenthal.
Inventor
Henry L. Doherty
By I. P. McElroy
Attorney

UNITED STATES PATENT OFFICE.

HENRY L. DOHERTY, OF NEW YORK, N. Y., ASSIGNOR TO THE IMPROVED EQUIPMENT COMPANY, OF NEW YORK, N. Y., A CORPORATION OF COLORADO.

PROCESS OF AND APPARATUS FOR PRODUCING GAS.

1,235,774.  Specification of Letters Patent.  Patented Aug. 7, 1917.

Application filed September 5, 1913. Serial No. 788,231.

*To all whom it may concern:*

Be it known that I, HENRY L. DOHERTY, a citizen of the United States, residing at New York, in the county of New York and State of New York, have invented certain new and useful Improvements in Processes of and Apparatus for Producing Gas, of which the following is a specification.

This invention relates to processes of and apparatus for producing gas; and it comprises a method of producing gas wherein a bed of ignited fuel is blown with a current of air of constant volume containing a preadjusted constant volume of waste steam, by supplying a gas producer with an air draft from a positively acting blower driven by a reciprocating steam motor and feeding the exhaust steam, or a constant fraction thereof from said steam motor into said air draft; and it also comprises an organization of apparatus elements comprising a reciprocating steam motor, a positively acting blower driven thereby, a gas producer, an air draft conduit between the blower and the gas producer and a throttled connection between the exhaust steam port of said steam motor and said air draft conduit; all as more fully hereinafter described and as claimed.

In the manufacture of gas in a gas producer it is a frequent practice to render useful a portion of the heat of reaction by admixing the air of the draft current with an endothermically acting body, usually carbon dioxid (as products of combustion) or water vapor, whereby the quantity of gas delivered is increased at the expense of the heat of the producer and of the sensible heat of the gas. The attendant reduction of temperature in the producer is also useful in that it prevents, or tends to prevent, formation of slag or clinker from the fuel ash. In my United States Patent 829,105 I have disclosed and claimed a method of regulating temperature in a gas producer to prevent slagging and clinkering by utilizing carbon dioxid in this manner.

As an endothermic body, carbon dioxid has the advantage over steam that its latent heat is less and being a gas there is no heat of vaporization to complicate its use, but as it is ordinarily used in the form of products of combustion where it is accompanied by nitrogen, it does not enrich the gas. Water vapor on the other hand does not introduce any useless gases and to the extent which it is employed it gives a richer gas; a gas with a higher B. T. U. value. It is ordinarily employed either in the form of evaporated moisture by passing air, or a hot mixture of air and products of combustion, over bodies of water; or steam is directly generated and supplied to the draft current, ordinarily as an impelling jet. Both ways have practical and economical disadvantages; and in both the ratio between the air and the water vapor is irregular while the admixture of air and vapor secured is apt not to be uniform since water vapor is lighter than air and does not mix well with it so that stratification is apt to exist in the draft current. Water vapor because of its high latent heat and high heat of dissociation exercises a particularly vigorous chilling action on the fuel bed and any temporary excess over the right amount in the draft current, or any local stratification in the draft current is apt to cause much trouble while any entrained moisture, because of its high latent heat of vaporization, causes a still more vigorous local chilling in the fire bed. In running a gas producer, the temperatures in the fire bed should be uniform and constant. Ordinarily, therefore, for safety less water vapor than might advantageously be employed is used with the draft current. Even so, there is apt to be blackening or extinction of the fire at the point where the mixed draft enters and there are also apt to be localized points or zones of extinction or blackening. Further, in the case of jet steam, there is the cost of production of the steam while its utility as an air-propelling means is less than that of the same steam used in an engine. The efficiency of a steam injector for this purpose is very low and by reason of condensation in expansion beyond the jet nozzle moisture is formed and is entrained and goes forward with the draft current into the producer.

In the present invention I have devised a method of and means for producing a mixed or balanced jet having an automatically controlled proportioning between the air and steam components as well as thorough admixture of the same, in which the expansion of the steam is first utilized to produce power to drive air and the expanded steam is then admixed as exhaust with the driven air. The amount of exhaust steam will, of course, automatically correspond to and vary with the amount of air driven. Condensation moisture, which will be a constant amount, is removed. The means for impelling the air and driven by the motor must, of course, be positive, or the relation between exhaust steam and driven air will not be a constant proportion. An ordinary rotary blower of the impeller, or Root blower type, is suitable for the present purpose. Any ordinary reciprocating steam engine may be employed, even if of an inefficient slide valve type.

Products of combustion may also be admixed with the draft if desired and such an admixture is frequently advantageous.

Any ordinary type of gas producer may be employed.

In the present invention the producer is fed with a constant positively fed current of air and steam and the air and steam are in a fixed ratio. This ratio may be that naturally existing between the air transmitted by the particular blower used and the exhaust from the particular steam motor employed; or it may be an artificially established ratio produced by by-passing an adjusted fraction of the exhaust to waste.

In the accompanying illustration I have shown, more or less diagrammatically, an apparatus embodiment of the present invention. In this drawing:

Element 1 is an ordinary rotary air impeller driven through shaft 2 by engine 3, shown as an ordinary upright reciprocating steam engine. Air is supplied to the impeller through conduit 4, valved at 5. Conduit 6, valved at 7, may furnish products of combustion if desired. The air from the impeller goes through draft conduit 8 to gas producer 9 containing the usual deep bed of ignited fuel. Leading from the exhaust port of the engine is steam conduit 10, valved at 11, and entering the draft conduit as jet nozzle 12. Tapping the steam conduit behind the valve is a by-pass conduit 13, valved at 14. In the draft conduit is a collar 15 forming a low point in which accumulates any condensation water and this water may be led off by drainage conduit 16. The by-pass conduit for excess of waste steam is tapped into this drainage conduit.

In the operation of the above-described assemblage the impeller if driven at constant speed will deliver a constant volume of air per time unit, irrespective of producer conditions, and with this constant volume of air will be admixed a constant volume of waste steam, either the whole volume of waste steam where 11 is fully open and 14 closed, or an adjusted fraction where 11 is partly closed and 14 partly open. Regulation of 11 and 14 will produce any desired back pressure on the engine and thereby increase or diminish the relative volumes of exhaust steam and air. Whatever the relation may be however, when once established it will remain constant. Speeding up the engine will increase the absolute amount of air delivered per second, and, concomitantly, the amount of exhaust steam delivered to it. By running the engine under some back pressure, the exhaust will be delivered through 12 with some force and will produce a thorough admixture in conduit 8; the action in this respect being different in that of a jet operating in an ordinary injector casing. The exhaust steam expands freely into a closed conduit containing moving air with which it mixes well while the velocity of the air is not such as to carry forward or entrain condensation moisture. An injector introduces an amount of air fluctuating with temporary fluctuations in the force of the jet and is apt to give either a striated stream of air and steam or in some degree alternating pulses of each, or, rather, pulses of mixtures of different proportions. And the force of the jet carries forward condensates. With a jet nozzle delivering into a closed conduit carrying a stream of air under other pressure, admixture is good. Any entrained condensation water is disposed of by 15 and 16 and does not interfere with the working of the producer.

What I claim is:—

1. In the manufacture of gas the process which comprises maintaining a deep bed of ignited fuel, forming an admixed draft of steam and air automatically proportioned in a predetermined ratio adapted to maintain the temperature equilibrium occurring between heat producing and heat absorbing actions in the fuel bed at a temperature below the objectionable clinkering temperature of the fuel, said ratio being maintained constant by expanding steam to drive air and mixing the expanded steam with the driven air, and forcing said admixture draft through the bed of fuel.

2. In the manufacture of gas the process which comprises maintaining a deep bed of ignited fuel, expanding steam to drive air, mixing a constant fraction of the steam so expanded with the air so driven to form a mixture having a predetermined ratio adapted to maintain the temperature equilibrium occurring between heat producing and heat absorbing actions in the fuel bed at a temperature below the objectionable clinkering temperature of the fuel, and forcing said draft through said bed of fuel.

3. In the manufacture of gas the process which comprises maintaining a deep bed of ignited fuel, forming an admixed draft of steam and air automatically proportioned in a predetermined ratio adapted to maintain the temperature equilibrium occurring between heat producing and heat absorbing actions in the fuel bed at a temperature below the objectionable clinkering temperature of the fuel, said ratio being maintained constant by the volume of forced air, removing condensed steam from the mixture without interfering with the ratio and forcing said draft through said bed of fuel.

4. In a gas organization, the combination of a gas producer adapted to contain a deep bed of ignited fuel, a draft conduit connected to said producer, a positively acting blower supplying a draft comprising air to said conduit, a reciprocating engine driving said blower and an exhaust steam conduit from said engine tapped into said draft conduit.

5. In a gas making organization, the combination of a gas producer adapted to contain a deep bed of ignited fuel, a draft conduit connected to said producer, means for removing condensed moisture from said conduit, a positively acting blower supplying a draft comprising air to said conduit, a reciprocating engine driving said blower, a valved exhaust steam conduit from said engine tapped into said draft conduit and a valved by-pass communicating between said exhaust steam conduit and said moisture removing means.

In testimony whereof, I affix my signature in the presence of two subscribing witnesses.

HENRY L. DOHERTY.

Witnesses:
EUGENE Y. SAYER,
GEORGE REX SHIELDS.